United States Patent
Hoshino et al.

[11] Patent Number: 6,046,996
[45] Date of Patent: Apr. 4, 2000

[54] IDENTIFIER TRANSLATION APPARATUS

[75] Inventors: Tadashi Hoshino; Naoki Aihara; Takashi Tabu; Tomoyuki Yamaguchi, all of Kawasaki, Japan

[73] Assignee: Fujitsu Limited, Kanagawa, Japan

[21] Appl. No.: 08/713,239

[22] Filed: Sep. 12, 1996

[30] Foreign Application Priority Data

Jan. 25, 1996 [JP] Japan .................................. 8-011037

[51] Int. Cl.[7] .................................................. H04L 12/56
[52] U.S. Cl. ........................................... 370/392; 370/397
[58] Field of Search .................................. 370/395, 396, 370/397, 392, 399, 400, 401, 409, 393

[56] References Cited

U.S. PATENT DOCUMENTS

| 5,390,174 | 2/1995 | Jugel | 370/392 |
|---|---|---|---|
| 5,394,393 | 2/1995 | Brisson et al. | 370/392 |
| 5,414,701 | 5/1995 | Shtayer et al. | 370/397 |
| 5,430,715 | 7/1995 | Corbalis et al. | 370/392 |
| 5,479,401 | 12/1995 | Bitz et al. | 370/397 |
| 5,546,387 | 8/1996 | Larsson et al. | 370/392 |

FOREIGN PATENT DOCUMENTS

2-206259  8/1990  Japan .
5-268241  10/1993  Japan .

*Primary Examiner*—Chau Nguyen
*Attorney, Agent, or Firm*—Helfgott & Karas, P.C.

[57] ABSTRACT

An identifier translation apparatus is provided that does not require a prohibitively large memory capacity and that is simple in construction and capable of increasing the speed of processing. Using an address consisting of a VPI and the high-order 6 bits of a VCI, a first-stage table is read to retrieve a block number, and using an address consisting of the retrieved block number and the low-order 6 bits of the VCI, a second-stage table is read to retrieve a routing tag. The routing tag is then appended to a cell.

6 Claims, 11 Drawing Sheets

| b15 | | b0 |
|---|---|---|
| EN | VP | NOT USED | SECOND-STAGE TABLE BLOCK NUMBER | Pt |

EN: ENABLE FLAG,
VP: VP SERVICE IDENTIFICATION FLAG (=0),
Pt: PARITY

Fig. 7

| b15 | | b0 |
|---|---|---|
| EN | VP | NOT USED | ROUTING TAG | Pt |

EN: ENABLE FLAG,
VP: VP SERVICE IDENTIFICATION FLAG (=1),
Pt: PARITY

Fig. 8

| b15 | b0 |
|---|---|
| EN | NOT USED | ROUTING TAG | Pt |

EN: ENABLE FLAG, Pt: PARITY

IDENTIFIER TRANSLATION APPARATUS

BACKGROUND OF THE INVENTION

1. Field of the Invention

The present invention relates to an identifier translation apparatus for translating a routing identifier contained in cell data, and more particularly to an ATM (asynchronous transfer mode) cell header translation apparatus for use in communication equipment such as terminals, cross connect equipment, and ATM switches that form nodes in a broadband integrated services digital network (B-ISDN).

ATM is a type of fixed-length packet communication by which information segmented into cells of 53 bytes is transferred through a communication network. Each cell is routed across the network in accordance with a virtual path identifier (VPI) and a virtual channel identifier (VCI) carried in a 5-byte header of the cell. The VPIs and VCIs are identifiers used to identify virtual paths (VPs), a plurality of virtual communication paths set up between nodes in a network, and virtual channels (VCs) which are virtual communication channels that exist within the VPs. When a cell is relayed through the network toward the destination, the VP and VC are identified based on the VPI and VCI of the incoming cell at each node, and based on the thus identified VP and VC, the node appends an appropriate VPI and VCI preassigned to the VP and VC outgoing to the destination, thereby relaying the cell through the network for delivery to the destination.

There are two types of interfaces used in a communication network: the user network interface (UNI) between the user and the network, and the network node interface (NNI) between equipment (nodes) within the network. At the UNI, routing is performed usually based on the VCI and the VPI which corresponds to its higher address, while at the NNI, routing is performed usually based on the VPI only.

To implement the above configuration, each node needs to be equipped with a function for translating the header information of an incoming cell to outgoing header information. Such a header translation function for an incoming cell will also become necessary when translating the information to an identifier (tag) used to route the incoming cell within a node or to perform processing for each VPI/VCI value. The present invention relates to an ATM cell header translation function as described above.

2. Description of the Related Art

Heretofore, to perform such translation, either a method using a simple table or a method involving matching operations using a contents association memory (CAM) has been used.

In the simple table method, boundary control is first applied to the VPI and VCI in the header of an input cell. In the boundary control, a predetermined number of LSBs of the VPI and VCI are extracted as valid bits from the total of 28 bits constituting the VPI/VCI (24 bits in the case of the UNI), the extracted LSBs from the respective identifiers then being concatenated to form an address for a translation table. The address is used to read the translation table, as a result of the which translated data is obtained. The VPI and VCI of the input cell are replaced by this data. This simple table lookup method has the shortcoming that the table size increases as the valid bit length of the VPI/VCI increases. For example, in boundary control, when the VPI valid bit length, m, is 6 and the VCI valid bit length, n, is 10, the address space is at most $2^{16}$; if the table is constructed using a RAM, this means a RAM capacity of $2^{16} \times 29 = 1.9$ Mb. However, when m=12 and n=12, the required RAM capacity will increase up to $2^{24} \times 29 = 475$ Mb (when the number of bits to be translated is 29). In a practical implementation, it is required to process about that number of bits given in the latter case. Since a large-capacity memory is required when the valid bit length of the VPI/VCI is large, this simple table method is economically disadvantageous.

In the CAM method of the other prior art, the VPI and VCI in an incoming cell are compared with the VPI/VCI values before translation stored in a matching table, and the VPI/VCI values after translation corresponding to the VPI/VCI values before translation that matched the incoming data are obtained as the VPI and VCI for the outgoing cell. Header translation is accomplished by replacing the VPI/VCI in the incoming cell with the VPI/VCI values after translation thus obtained. In this method, the VPI/VCI of each incoming cell must be compared with all VPI/VCI values before translation stored in the matching table virtually within a one-cell relay time through the node. This one-cell relay time is about 2.7 microseconds in the case of a line speed of 155.52 Mbps, and only 0.7 microsecond in the case of a line speed of 622.08 Mbps. The number of references made to the memory for matching is therefore limited. Usually, comparison with 4,096 or more data items is needed, though it depends on the number of data items to be referenced. It is not practically possible to accomplish this within the one-cell relay time and, in reality, there is no choice but to process multiple cells in a multiplexing manner, thereby bringing the apparent processing time to within the one-cell relay time. This not only increases the size and complexity of the circuit involved but requires an expensive, high-speed LSI internal memory or independent memory to achieve faster access to the matching table. This method, therefore, is uneconomical.

SUMMARY OF THE INVENTION

It is an object of the present invention to improve the prior header translation method that was complex and expensive, and to provide an inexpensive, simple method that can accomplish a comparable function.

According to the present invention, there is provided an identifier translation apparatus for translating a first identifier, contained in cell data and identifying a cell data route in a first path, to a second identifier identifying a cell data route in a second path, comprising: a first memory for storing block numbers one of which is addressed by a first part of a first identifier contained in the cell data; a second memory for storing second identifiers one of which is addressed by said one of the block numbers and a second part of the first identifier; and an identifier translator for incorporating said one of the second identifiers into the cell data.

By employing the configuration where the block number is addressed by the first part of the first identifier and the second identifier is addressed by the block number and the second part of the first identifier, there is no need to provide a memory that can accommodate the whole address space mapped with all the bits of the first identifier when there is a limit to the number of first identifiers used simultaneously. Accordingly, the required memory capacity can be reduced to a realistic value. Furthermore, since the memory is read by directly addressing by using the block number and the bits constituting the first identifier, high-speed processing is achieved with simple circuitry.

DESCRIPTION OF THE PREFERRED EMBODIMENTS

Figure 1:
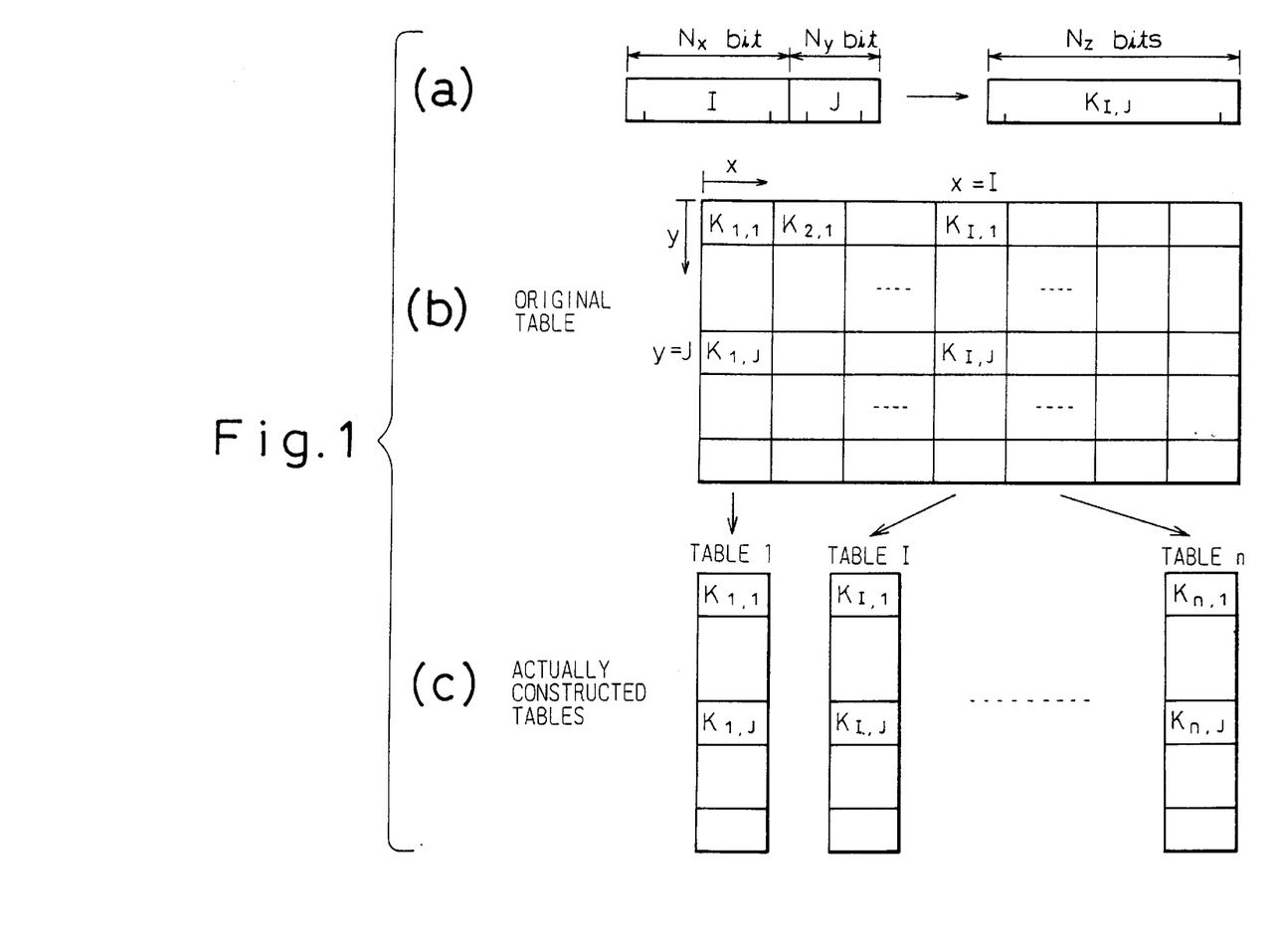
FIG. 1 is a diagram for explaining the basic principle behind the present invention.

FIG. 1 is a diagram for explaining the basic principle behind the present invention. As shown in part (a), when the value represented by the high-order $N_x$ bits of the (VPI, VCI) in the header information of an incoming cell is denoted by I, and the value represented by the low-order $N_y$ bits of the (VPI, VCI) is denoted by J, then (VPI, VCI)=I$\times 2^{NY}$+J is translated to the outgoing (VPI, VCI)=K.

In the ordinary table lookup method, the outgoing (VPI, VCI) corresponding to the incoming (VPI, VCI) is obtained at the intersection of x=Ith column and y=Jth row. It is therefore necessary to secure a table area that can accommodate all possible combinations of x and y values; that is, the table capacity increases as $N_x$ and $N_y$ increase. However, in reality, the total number of VPI/VCI combinations that need translation is limited to within a certain number much smaller than the total number of possible combinations of the values that x and y can respectively take. In the present invention, the table is divided into a plurality of tables one for each column, as shown in part (c), and a necessary number of tables are created and deleted in a memory in dynamic fashion according to the VPI and VCI that need translation, thus reducing the required table capacity and hence the total memory capacity required. If the total number of VPI/VCI combinations that actually need translation is n, the total number of tables created column-wise is n at the maximum. It is therefore only necessary to secure a total table capacity equivalent to n tables each having $2^{NY}$ width. In an actual implementation, a separate table is required to map the values of x into the tables in memory, since the necessary tables are created and deleted in memory in dynamic fashion.

Figure 2:
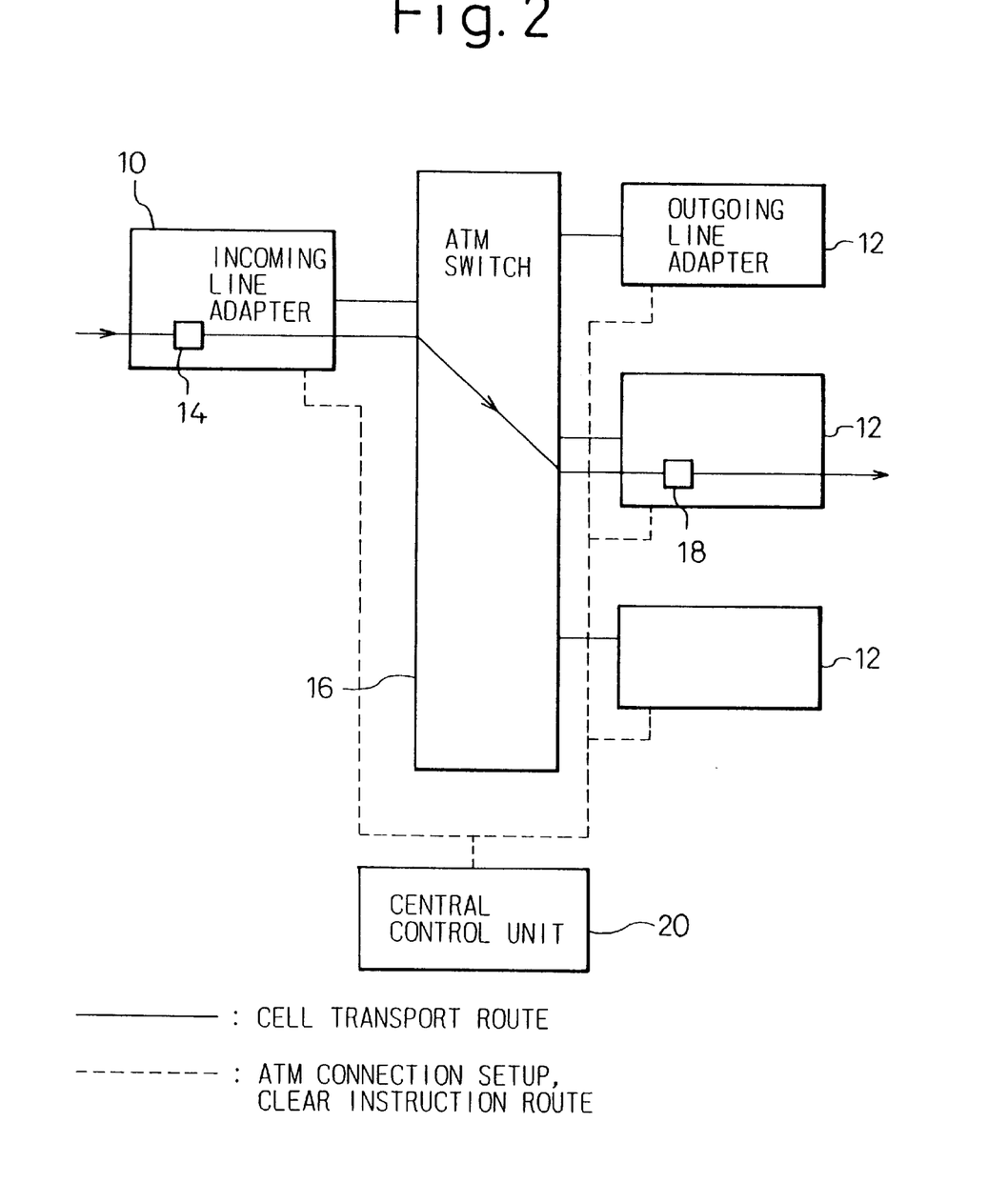
FIG. 2 is a diagram showing the system configuration of an ATM switch as an example of communication equipment where the present invention is applied.

FIG. 2 shows the system configuration of an ATM switch as an example of communication equipment where the present invention is applied. Line adapters 10 and 12 have such functions as terminating the physical layers of the respectively corresponding lines and extracting ATM cells or mapping ATM cells into a format on the physical layers of the corresponding lines. A header translator 14 provided in the incoming line adapter 10 has the function of extracting a header from each ATM cell received from the line and appending a routing tag necessary for routing the cell through the ATM switch 16 to the line outgoing for delivery to the destination. The ATM cell is thus routed through the ATM switch 16 and transported to the designated outgoing line adapter 12, where a VPI/VCI translator 18 obtains prescribed VPI/VCI values on the outgoing line from the routing tag and appends them to the outgoing cell. The ATM switch 16 examines the routing tag of the incoming cell and directs the cell to the outgoing line adapter 12 on the designated outgoing line. A central control unit 20 has the function of controlling the entire system by programs.

The information necessary for header translation at the header translator 14 is the mapping of the incoming VPI/VCI into the routing tag, and the information necessary for VPI/VCI translation at the VPI/VCI translator 18 is the mapping of the routing tag into outgoing VPI/VCI. Such mapping is set up under direction of the central control unit 20 when an ATM connection is established, and is cleared when the connection is cleared. Establishing and clearing an ATM connection is done dynamically in accordance with an instruction or request from a subscriber, another node, or maintenance staff.

Figure 3:
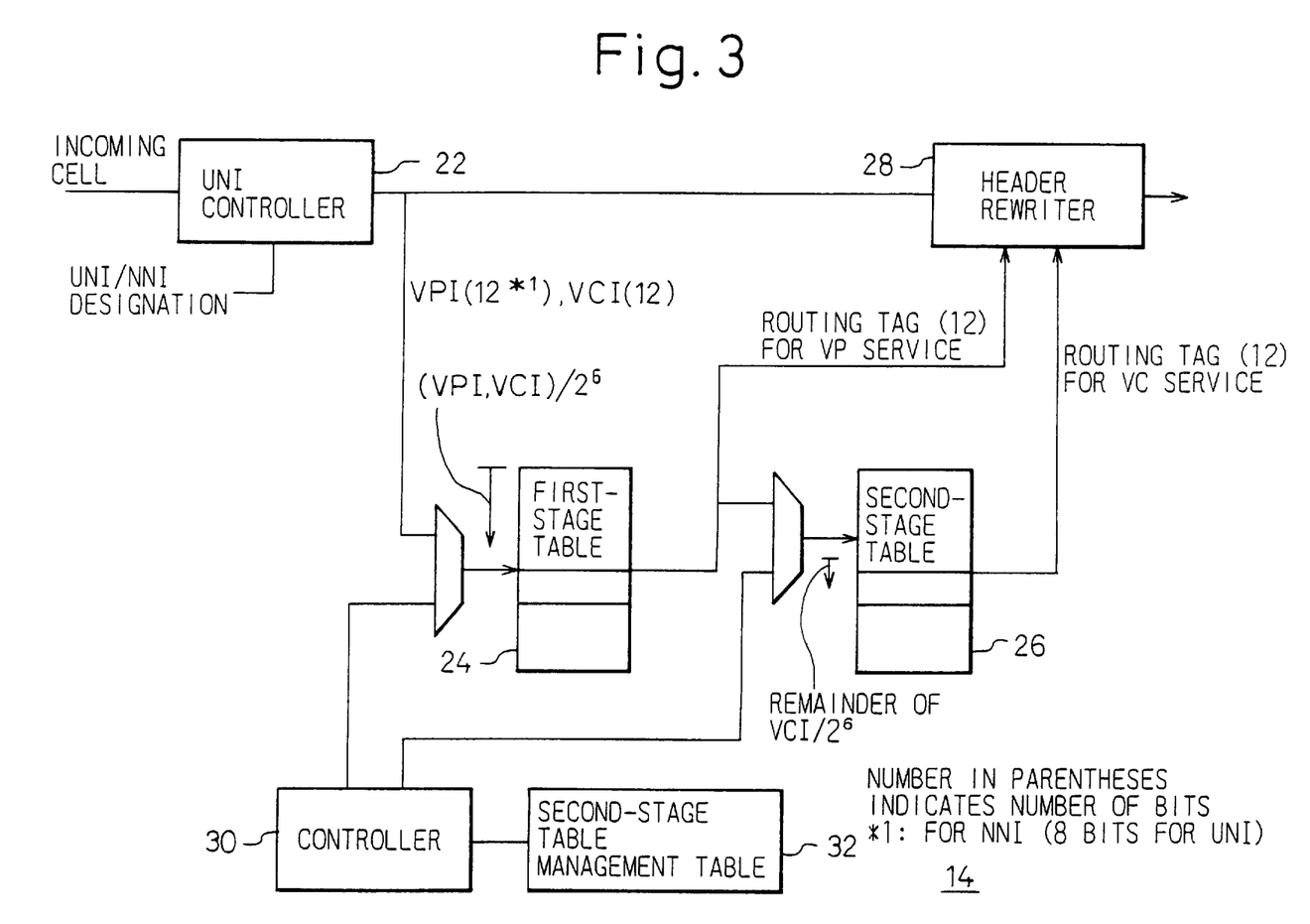
FIG. 3 is a detailed block diagram of a header translator 14 shown in FIG. 2.

FIG. 3 shows in detail the configuration of the header translator 14. The VPI/VCI translator 18 also may be constructed using a similar configuration, but in practice, the VPI/VCI translator 18 can be constructed from a simple table since the bit width of the routing tag input to the translator is small; therefore, an explanation of the VPI/VCI translator 18 will not be given here.

The header translator 14 of the present invention has the following functions.

(i) Of the maximum 28 bits of data of the VPI/VCI of the incoming cell, the valid bit width that can be processed as data before translation is 24 bits, so that the 12 bits of the VPI and the low-order 12 bits of the VCI are extracted as input information, based on which an intra-switch routing tag of 12 bits is output and added in the cell header. In the case of the UNI, however, since the bit width of the VPI is 8 bits, four redundant bits of zeros are added to fill in the 12 bits length so that the same processing as for the NNI can be performed.

(ii) The maximum number of VPI/VCI combinations that can be translated is set to 4,096.

(iii) Cells with VPI values set as VP service are all translated to the same value as the routing tag regardless of their VCI values.

(iv) If the registration or deletion of an ATM connection is not completed within one cell relay time, it will be completed within a time that does not present a practical problem. The specific time required for completion is determined by the performance of the memory chip used and the operating clock, specific configuration, etc. of the circuit involved.

Figure 4:
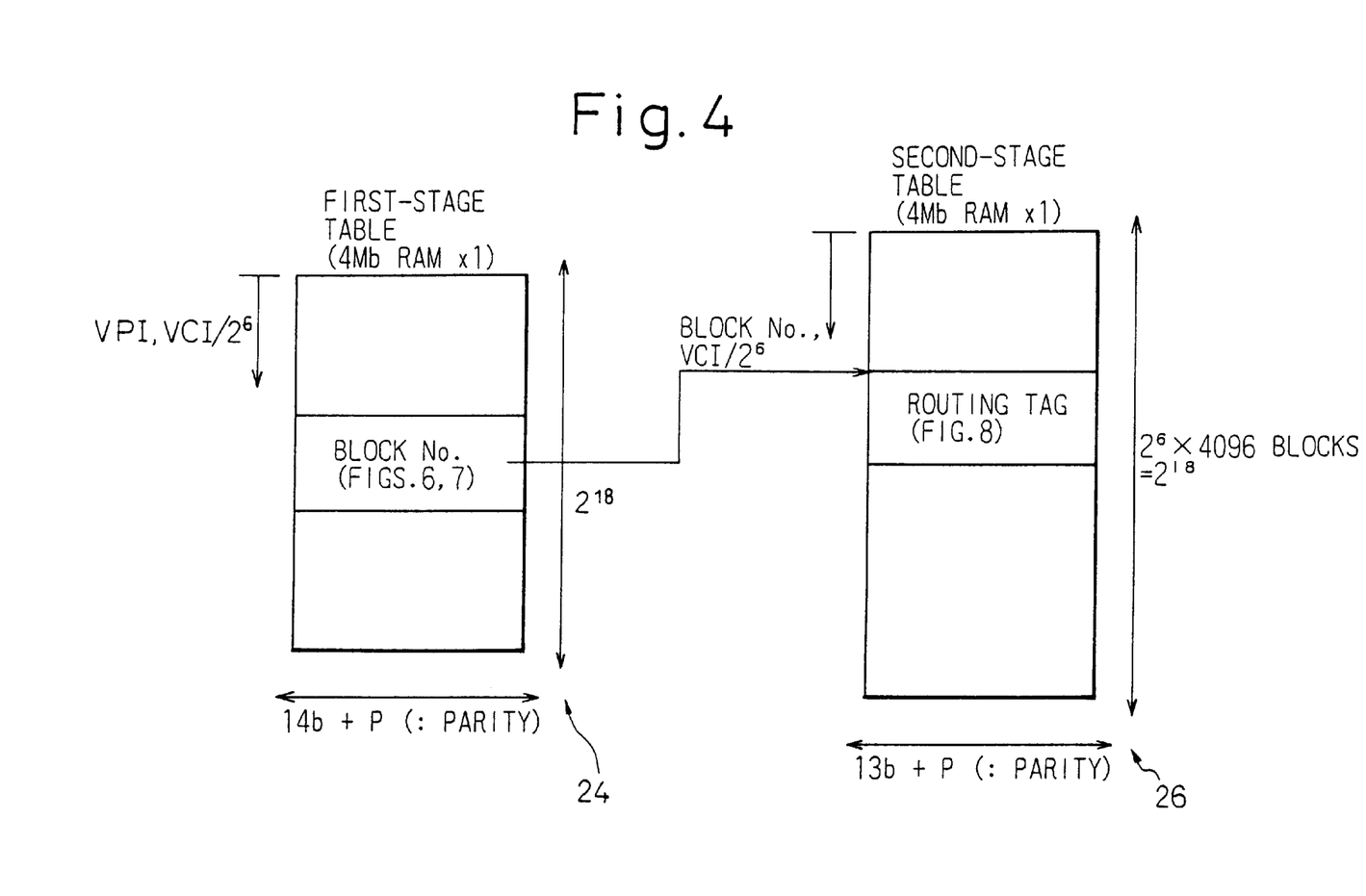
FIG. 4 is a diagram showing the structure of a first-stage table 24 and a second-stage table 26 shown in FIG. 3.
Figure 5:
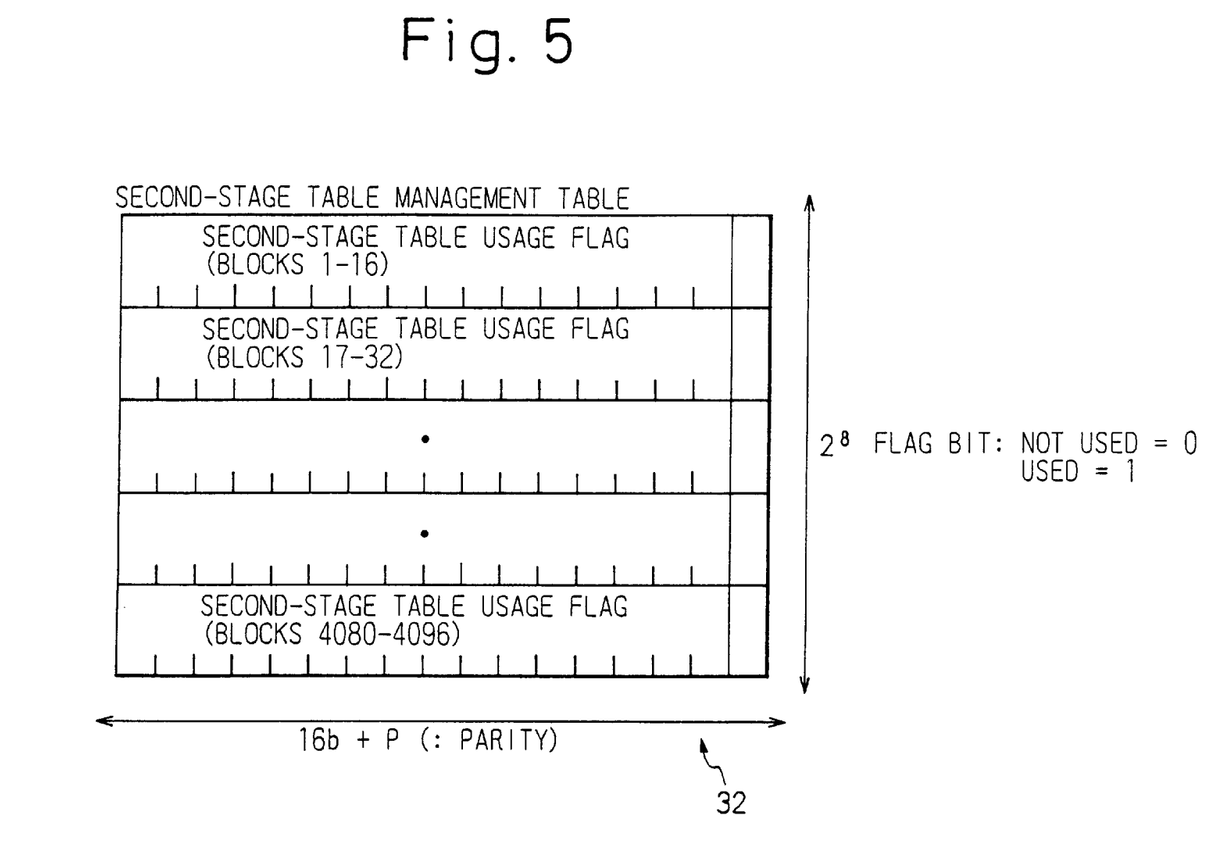
FIG. 5 is a diagram showing the structure of a second-stage table management table 32 shown in FIG. 3.

In FIG. 3, a UNI controller 22 performs processing to overwrite the 4-bit generic flow control (GFC) field with zeros when the equipment is used at the UNI. When it is set for use at the NNI, no processing is performed since the GFC field is used as part of the VPI field. A first-stage table 24 is used to translate a value, formed by concatenating the 12 bits of the VPI and the high-order 6 bits of the VCI in the incoming cell, to a corresponding but different value. The internal data structure of the first-stage table 24 is shown in FIG. 4. The translated data from the first-stage table 24 is multiplied by 64 (shifted to the left by 6 bits), and the resulting value, after adding the low-order 6 bits of the VCI, is translated to a corresponding but different value, in a second-stage table 26. The internal data structure of the second-stage table 26 is also shown in FIG. 4. A header rewriter 28 has the function of translating the header of the incoming cell to the value obtained by referring to the first-stage table 24 and second-stage table 26. At this time, if valid translated data is not obtained, the incoming cell is discarded here. A controller 30 is tasked with controlling writing to the first-stage table 24 and second-stage table 26 under direction of a host apparatus when an ATM connection is to be registered or deleted. A second-stage table management table 32 is used to manage empty blocks available for the second-stage table when the controller 30 registers or deletes the ATM connection. The internal data structure of the second-stage table management table 32 is shown in detail in FIG. 5.

Figure 6:
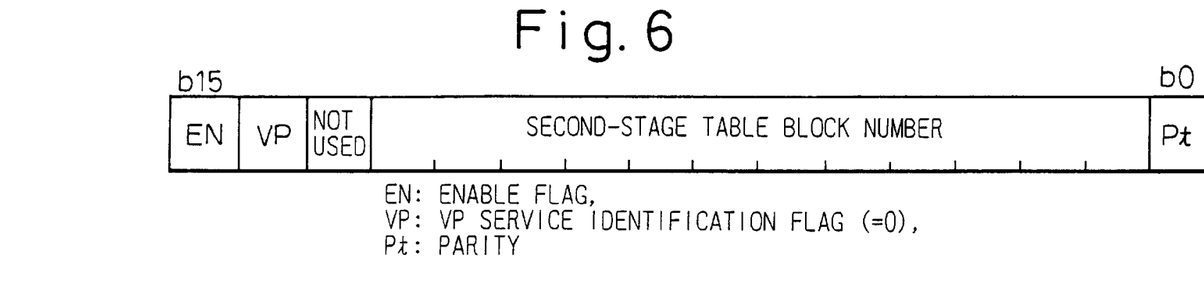
FIG. 6 is a diagram showing the structure of a word for VC service, stored in the first-stage table 24.
Figure 7:
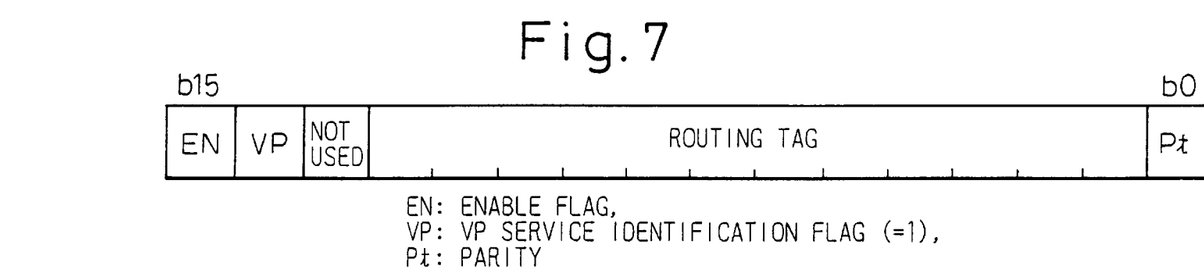
FIG. 7 is a diagram showing the structure of a word for VP service, stored in the first-stage table 24.

Referring to FIG. 4, the first-stage table is a RAM having a one word×$2^{18}$ address capacity (each word consisting of 16 bits of which 1 bit is not used). As shown in FIGS. 6 and 7, each word is structured in one of two ways, depending on whether it is used for VC service or for VP service. Data for VC service, as shown in FIG. 6, carries an enable flag, VP service identification flag, and second-stage table block number. The enable flag indicates whether the word contains valid data; the flag is set to 1 when an ATM connection is registered, and set to 0 when the connection is deleted. In the case of data for VC service, the VP service identification flag is set to 0. The second-stage table block number field holds the corresponding second-stage table block number. Data for VP service also carries an enable flag and a VP service identification flag, plus a routing tag. The meaning of the enable flag is the same as that for VC service. In the case of data for VP service, the VP service identification flag is set to 1. The routing tag is itself the final value to be obtained.

Figure 8:
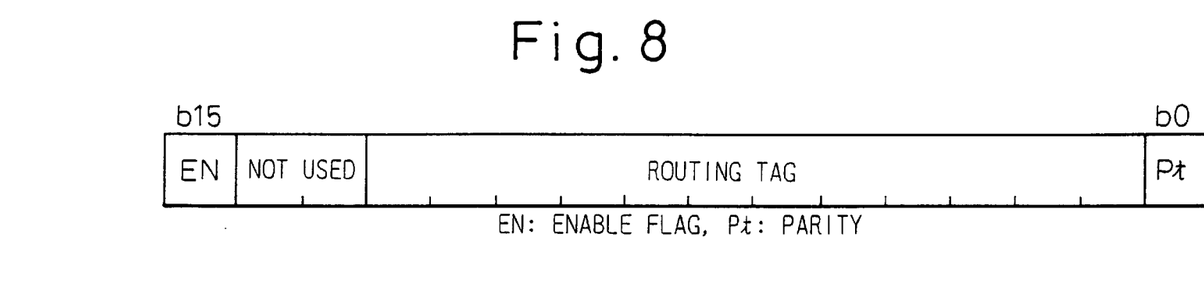
FIG. 8 is a diagram showing the structure of a word stored in the second-stage table 26.

The second-stage table 26 is a RAM having a one word×$2^{18}$ address capacity (each word consisting of 16 bits of which 2 bits are not used). The table is constructed from 4,096 blocks of 64 words. Each block is specified by the 12-bit block number carried in each word in the first-stage table. This block number constitutes the high-order 12 bits of the address in the second-stage table. A particular word in a block is specified by the low-order 6 bits of the VCI in the corresponding incoming cell; the low-order 6 bits of the VCI constitute the low-order 6 bits of the address in the second-stage table. Each word carries the enable flag and routing tag of the corresponding incoming cell, as shown in FIG. 8. The enable flag indicates whether the word holds valid data.

Figure 9:
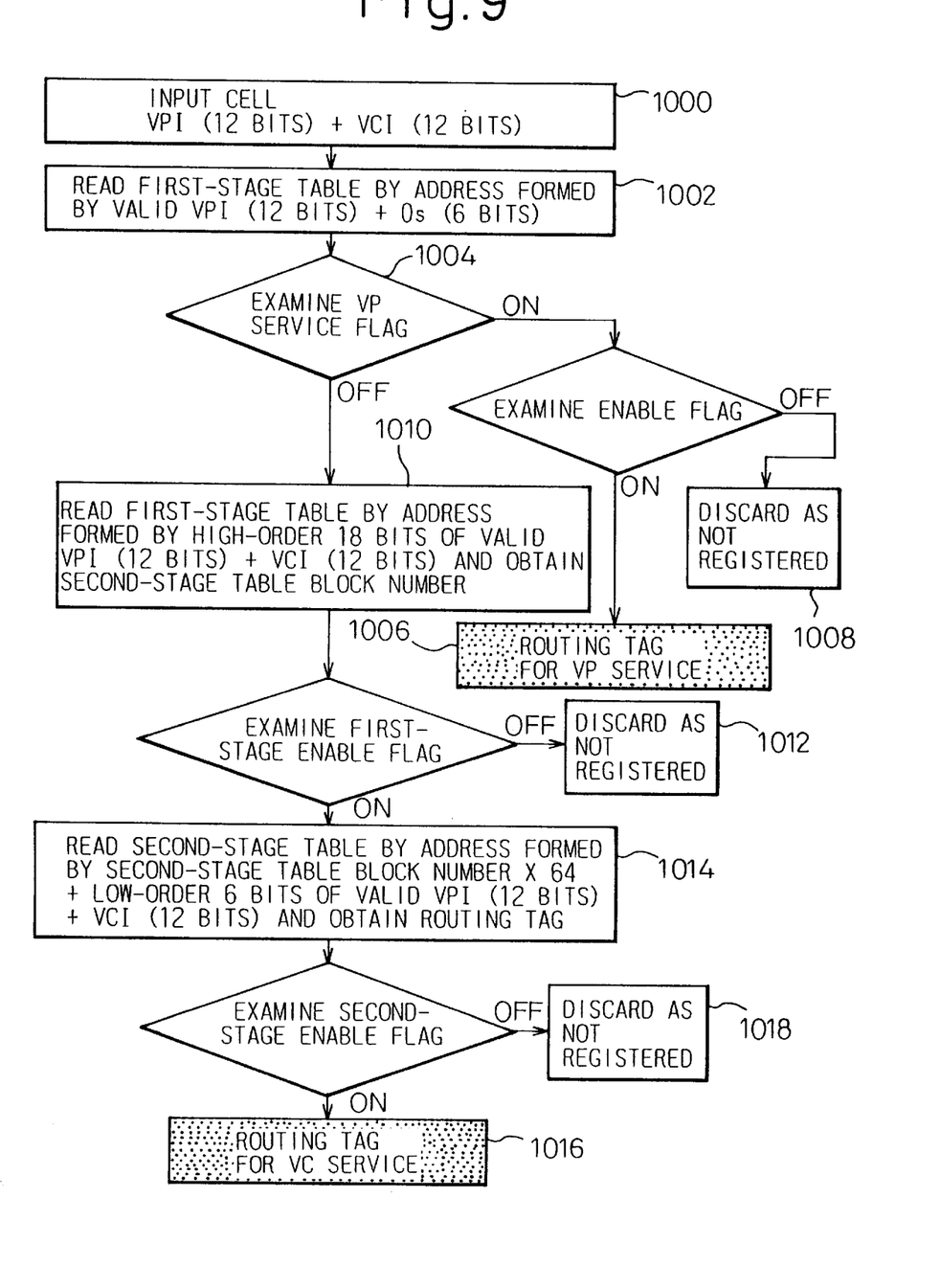
FIG. 9 is a flowchart for cell header translation.

FIG. 9 is a flowchart for cell header translation according to the present invention. In FIG. 9, when a cell is input (step 1000), the first-stage table is read by using an 18-bit address whose high-order 12 bits are formed by the valid 12 bits of the VPI in the input cell and whose low-order 6 bits are set to zeros (step 1002), and the VP service flag in the data specified by the address is examined (step 1004). The subsequent processing differs depending on the state of the flag. When the VP service flag is ON, it is determined that the input cell belongs to VP service, and processing is performed by taking the data written at the address as the routing tag. More specifically, the routing tag is added in the header of the input cell for output (step 1006). If, at this time, the enable flag is OFF, it is determined that no connection is registered, and the cell is discarded (step 1008).

When the VP service flag is OFF, the first-stage table is again read by using the high-order 18 bits of the 24-bit VPI/VCI field of the input cell, to obtain the block number of the second-stage table (step 1010), after which the following processing is performed. If, at this time, the enable flag is OFF, it is determined that no connection is registered, and the cell is discarded (step 1012).

Next, the block number obtained in step 1010 is multiplied by 64, the resulting value is added to the low-order 6 bits of the 24-bit VPI/VCI field of the input cell to construct an address and, using this address, the second-stage table is read to obtain the routing tag (step 1014), after which the prescribed processing is performed. More specifically, the routing tag is added in the header of the input cell (step 1016). If, at this time, the enable flag in the data stored at the address in the second-stage table is OFF, it is determined that no connection is registered, and the cell is discarded (step 1018).

Figure 10:
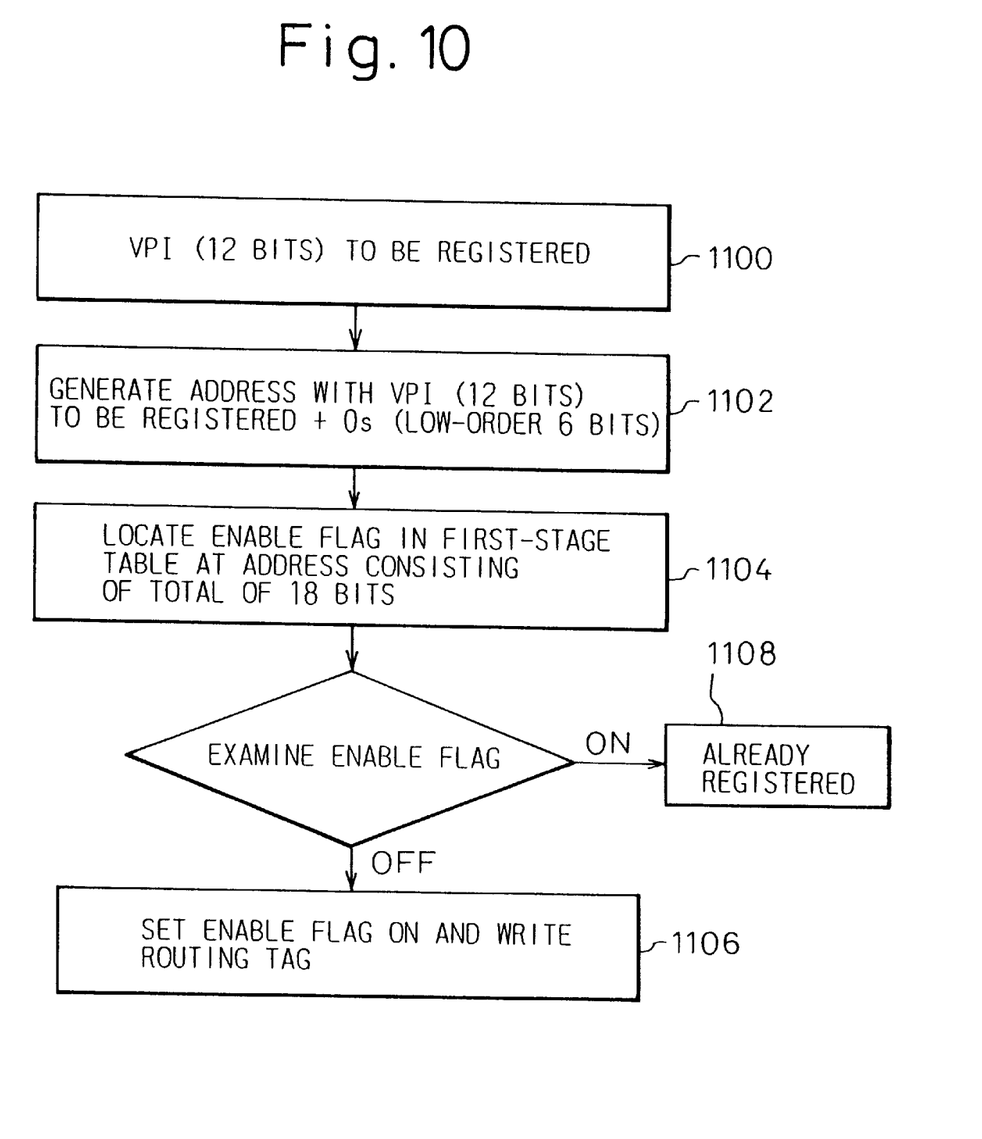
FIG. 10 is a flowchart for connection registration in VP service.
Figure 11:
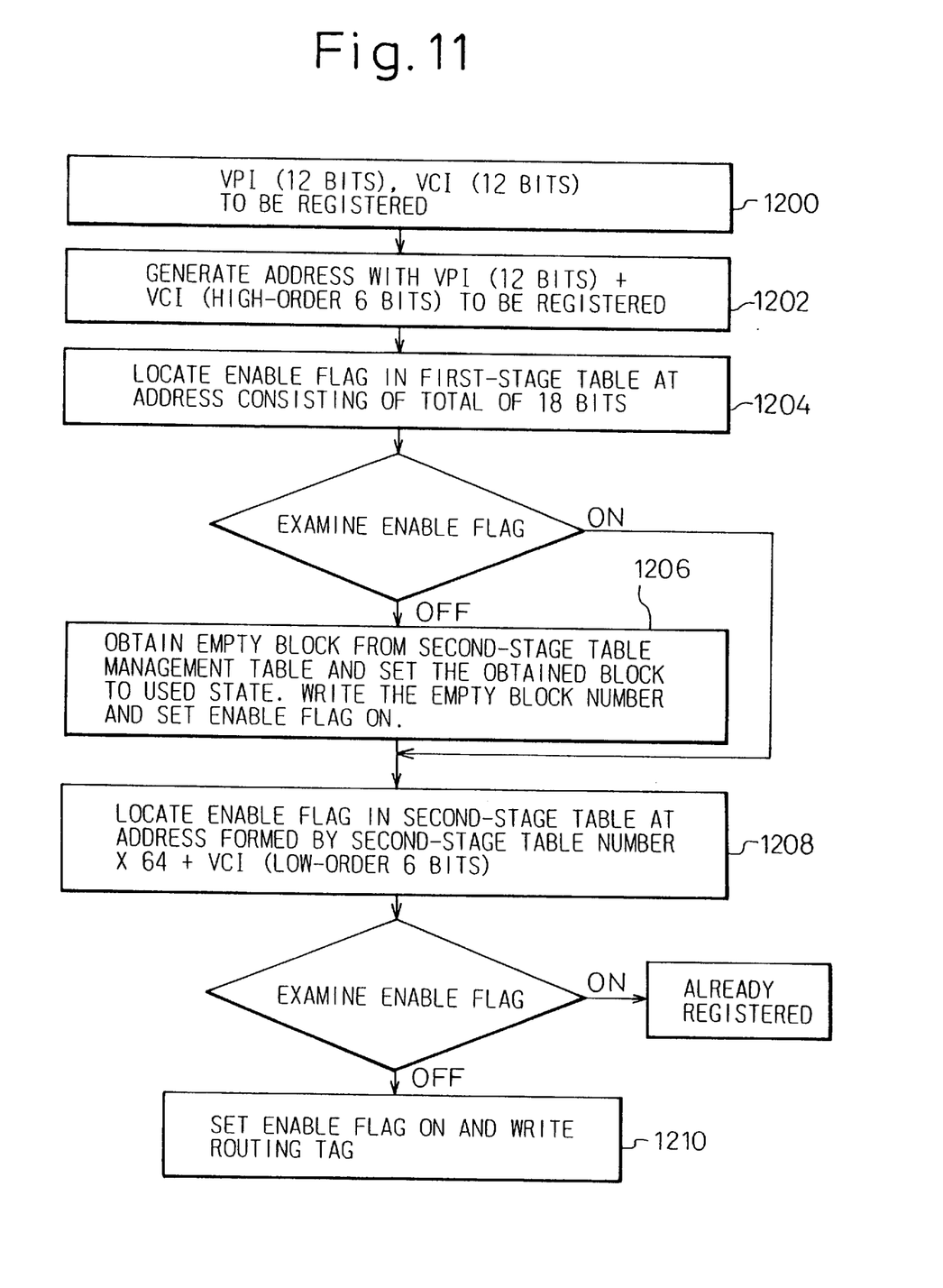
FIG. 11 is a flowchart for connection registration in VC service.

FIGS. 10 and 11 are flowcharts illustrating connection registration operations: FIG. 10 is for VP service and FIG. 11 for VC service.

In FIG. 10, an 18-bit address is generated whose high-order 12 bits is formed by the 12 bits of the VPI of the connection to be registered (step 1100) and whose low-order 6 bits are set to zeros (step 1102). Then, the enable flag in the addressed data in the first-stage table is set ON, and a routing tag is written in (step 1106). At this time, if the enable flag is already ON, no new registration is made since the connection is already registered (step 1108).

In the VC service of FIG. 11, an 18-bit address is generated whose high-order 12 bits are formed from the 12 bits of the VPI of the connection to be registered and whose low-order 6 bits are taken from the low-order 6 bits of the VCI of the connection to be registered (step 1202). Using this address, the first-stage table is read, and the enable flag is examined (step 1204). If the enable flag is OFF, the second-stage table management table is read to obtain an empty block, and the obtained block is set to a used state in the second-stage table management table. Further, the second-stage empty block number obtained is written in the first-stage table as the second-stage table block number, and at the same time, the enable flag is set ON (step 1206). If the enable flag is already ON, this means that the second-stage table block is already mapped, therefore, step 1206 is skipped and the process proceeds to the next step. The second-stage table block number obtained in step 1206 or the block number read from the first-stage table is multiplied by 64, and the resulting value is added to the low-order 6 bits of the VCI of the connection to be registered, to generate an address; then, the enable flag in the data at this address in the second-stage table is set ON, and at the same time, the routing tag is written in (steps 1208, 1210). If, at this time, the enable flag is already ON, no new registration is made since the connection is already registered.

Figure 12:
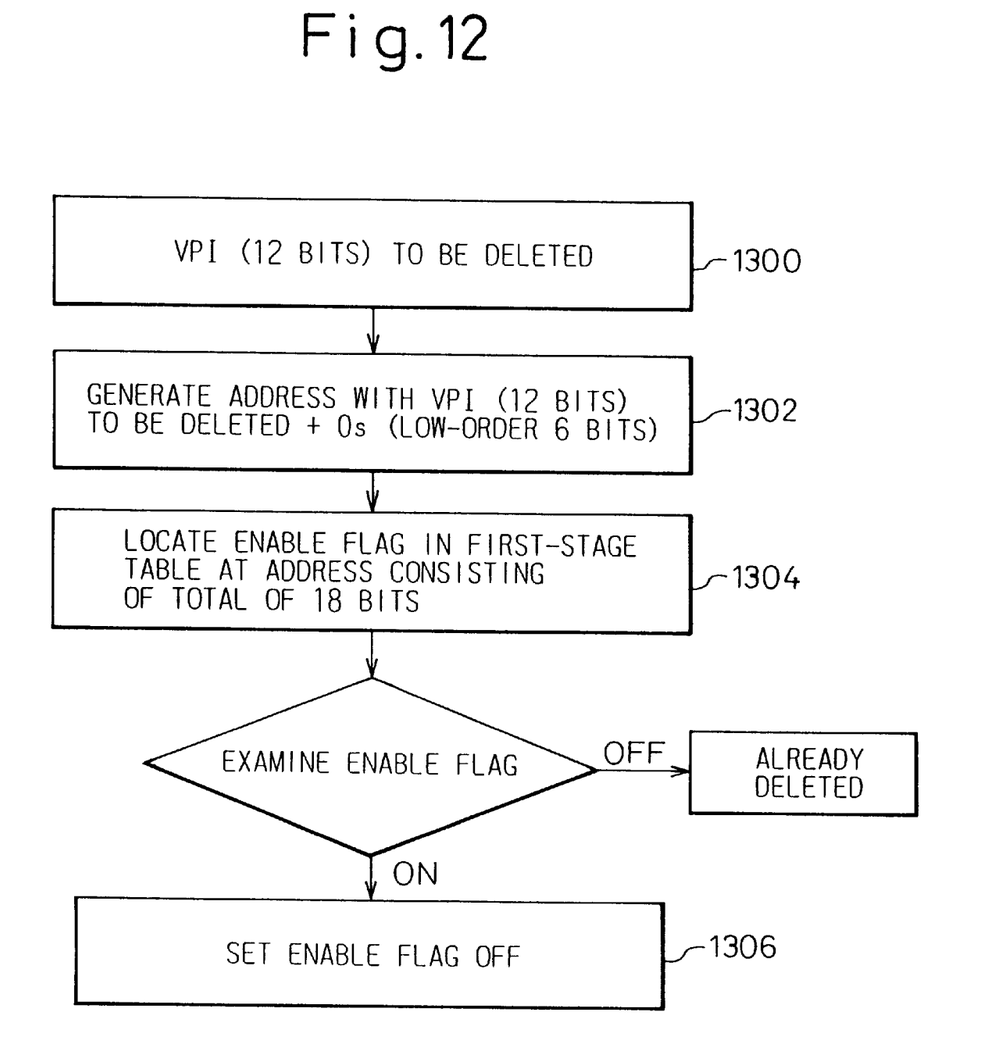
FIG. 12 is a flowchart for connection deletion in VP service.
Figure 13:
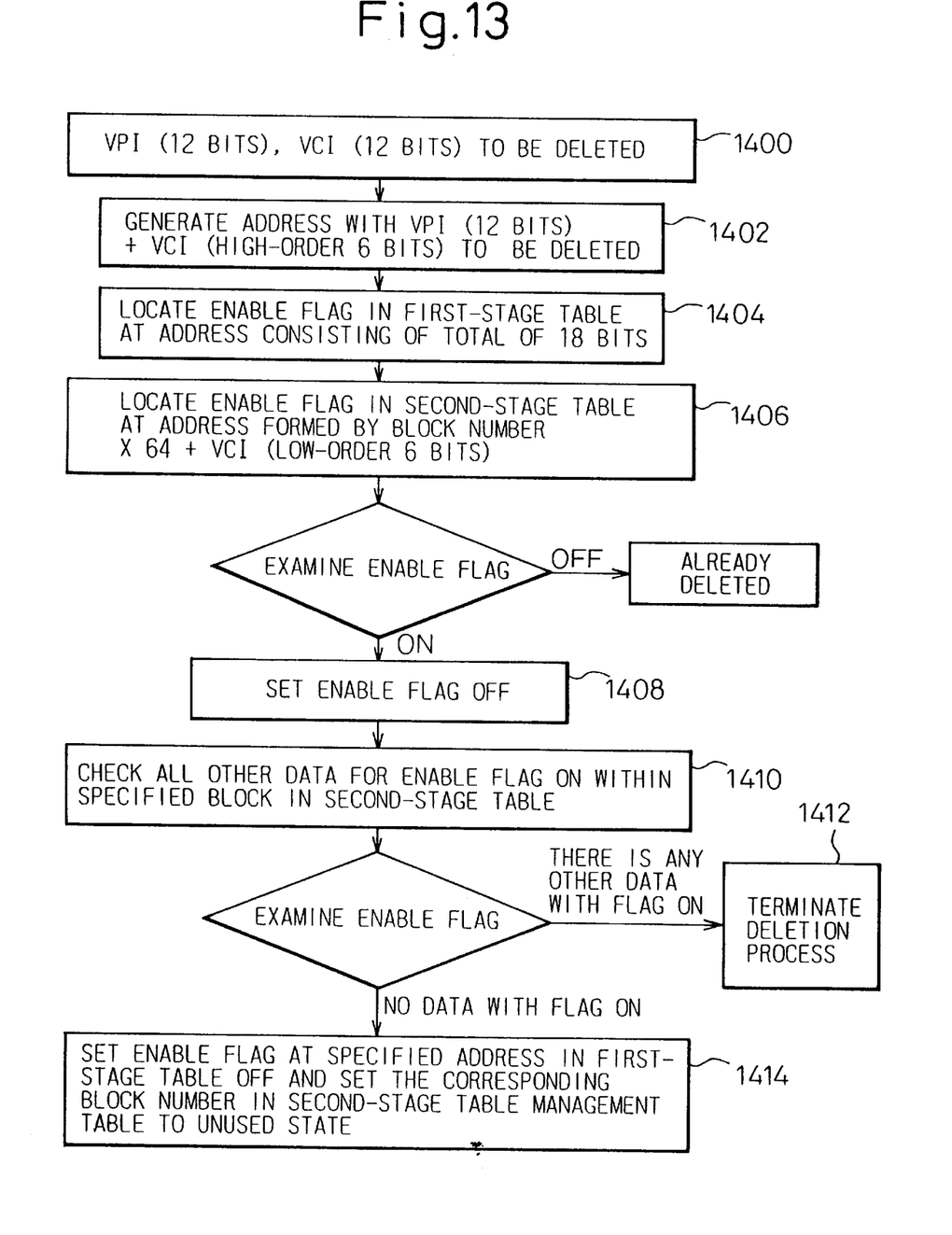
FIG. 13 is a flowchart for connection deletion in VC service.

FIGS. 12 and 13 are flowcharts for explaining the operations for deleting a registered connection: FIG. 12 is for VP service and FIG. 13 for VC service.

In FIG. 12, an 18-bit address is generated whose high-order 12 bits are formed by the 12 bits of the VPI of the connection to be deleted and whose low-order 6 bits are set to zeros (step 1302), and the valid flag in the word specified by the address is set OFF (step 1306). If the valid flag is already OFF, this means that the connection is already deleted.

In FIG. 13, an 18-bit address is generated whose high-order 12 bits are formed by the 12 bits of the VPI of the connection to be deleted and whose low-order 6 bits are taken from the low-order 6 bits of the VCI of the connection to be deleted (step 1402). Using this address, the first-stage table is read to obtain the second-stage table block number (step 1404). The second-stage table block number obtained in step 1404 is multiplied by 64, and the resulting value is added to the low-order 6 bits of the VCI of the connection to be deleted, to generate an address; then, the enable flag in the data at this address in the second-stage table is set OFF (steps 1406, 1408). Then, the enable flag is examined on all data within the block of the second-stage table obtained in step 1404, to check to see if there is any data whose enable flag is ON, other than the data corresponding to the connection to be deleted (step 1410). If there is any other data whose enable flag is ON within the same block, the deletion process is terminated (step 1412). If there is no such data, the enable flag in the data at the specified address in the first-stage table read in step 1404 is set OFF, and the corresponding second-stage table block number in the second-stage table management table is set to an unused state (step 1414).

The header translation method of the present invention has the following advantages.

(1) Header translation can be implemented at low cost because of simple construction.

(2) Simple construction provides excellent reliability.

(3) Since the construction can be implemented entirely in hardware or partly in firmware or software, the construction can be adapted flexibly according to the system to which the method is applied.

(4) Line adapters are supported for a wide range of line speeds ranging from 155.52 Mbps to 622 Mbps, and excellent technical performance is provided.

What is claimed is:

1. An identifier translation apparatus for translating a first identifier, contained in cell data and identifying a cell data route in a first path, to second identifier identifying a cell data route in a second path, wherein the first identifier includes a virtual path identifier for identifying a virtual path which is a virtual communication path, as well as a virtual channel identifier for identifying a virtual channel which is a virtual communication channel within the virtual path, comprising:

a first memory for storing block numbers one of which is addressed by a first part of the first identifier contained in the cell data, said first part of the first identifier including part of said virtual channel identifier;

a second memory for storing second identifiers one of which is addressed by said one of the block numbers and a second part of the first identifier; and an identifier translator for incorporating said one of the second identifiers into the cell data.

2. An apparatus according to claim 1, wherein the identifier translator incorporates the second identifier into the cell data by replacing the first identifier contained in the cell data with the second identifier.

3. An apparatus according to claim 1, wherein the identifier translator incorporates the second identifier into the cell data by appending the second identifier to the cell data.

4. An identifier translation apparatus for translating a first identifier, contained in cell data and identifying a cell data route in a first path, to a second identifier identifying a cell data route in a second path, comprising:

a first memory for storing block numbers one of which is addressed by a first part of the first identifier contained in the cell data;

a second memory for storing second identifiers one of which is addressed by said one of the block numbers and a second part of the first identifier;

an identifier translator for incorporating said one of the second identifiers into the cell data;

a second-memory management memory for storing flags respectively indicating whether blocks in the second memory each of which is identified by block number respectively contain valid second identifiers; and a controller for, by reference to the contents of the second-memory management memory, controlling writing to the first and second memories for registration and deletion of the second identifier corresponding to the first identifier.

5. An apparatus according to claim 1, wherein the first part of the first identifier includes at least all bits of the virtual path identifier, the first memory stores the block numbers in a VC service, the first memory stores the second identifiers in memory locations addressed by a plurality of specific virtual path identifier values in a VP service, and the identifier translator incorporates into the cell data the second identifier addressed by one of the specific virtual path identifiers.

6. An apparatus according to claim 5, wherein each word in the first memory has a field for storing a flag indicating whether the word is for the VP service.

* * * * *